G. S. Reynolds.
Horse Rake.

Nº 23943 — Patented May 10, 1859.

Witnesses.
Norman Fowler.
Charlotte L. Fowler.

Inventor.
George S. Reynolds.

UNITED STATES PATENT OFFICE.

GEORGE S. REYNOLDS, OF EAST BETHEL, VERMONT.

IMPROVEMENT IN HORSE HAY-RAKES.

Specification forming part of Letters Patent No. 23,943, dated May 10, 1859.

*To all whom it may concern:*

Be it known that I, GEORGE S. REYNOLDS, of East Bethel, in the county of Windsor and State of Vermont, have invented a new and useful improvement on the wheel independent-tooth horse hay-rake, (which was patented by Calvin Delano, February 27, 1849,) called "Reynolds's Independent Hay-Revolving Rake," of which the following is a full, clear, and exact description, reference being had to the accompanying drawings, making a part of this specification, in which—

Figure 1:
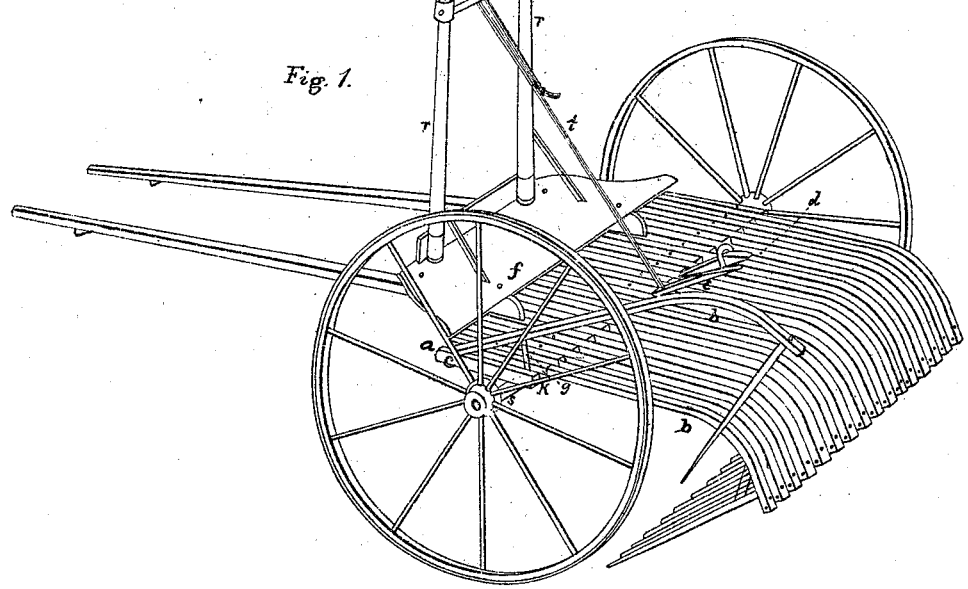
Figure 2:
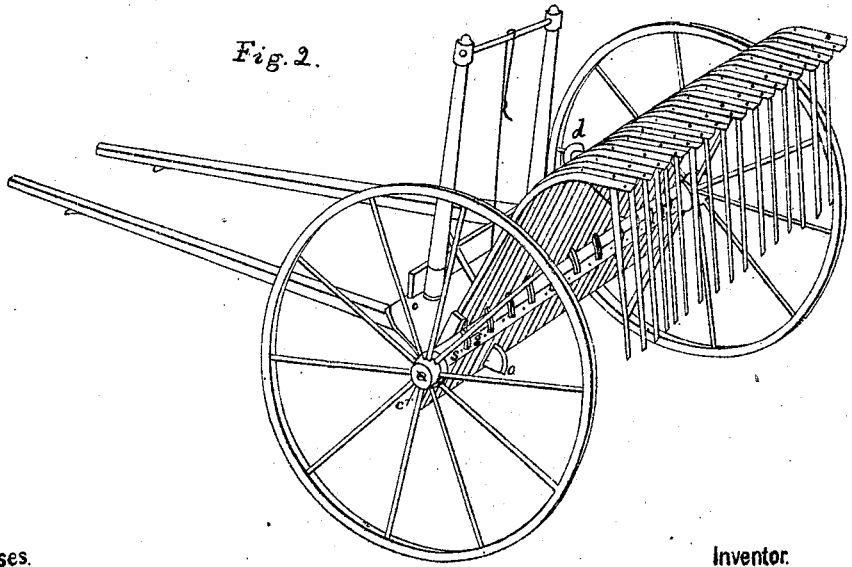

Figure 1 is a perspective view; Fig. 2, an elevated position.

S is the axle; a, the blocks; k, the boxes; b b, the arms; c, the rod; e, Fig. 2, the blocks to which the shafts are hung; g, Fig. 1, the springs; d, the shoe; E, the middle block; f, the board.

To enable others skilled in the art to make and use my invention, I will proceed to describe its construction and operation.

I construct my rake by locking on and bolting to the axle S, in the accompanying drawings, several blocks or strips of wood, a, leaving spaces K between, which form separate boxes k for the several arms b b to play in, thereby giving each a more independent position, where the old ones—i. e., the arms of the above Delano's patent rake—interfere, or, in one sense, depend upon each other. The arms are hung above the axle to a rod, c, which passes through the blocks in front of the axle, where the "old one" passes through iron uprights above the axle. The shafts are hung to the rod c, or to blocks e, Fig. 2, which are hung to it by taking out a portion of two of the blocks a, which portion being filled by the ends of the shafts or by the blocks e, which the shafts are hung to. The arms are balanced or raised over the axle, where the old ones are raised by a bar and levers. The arms are arching, for the purpose of holding more hay and being more liable to roll it. There are elastic straps or steel springs g applied to the arms and around or to the axle, for the purpose of bearing the teeth upon the ground. There is a shoe or step, d, hung to the middle block, E, which runs back, for the purpose of governing the rake with one foot by having a strap, t, across it. There is a board, f, upon the shafts, which prevents the rake from rising too high and forms a platform for the other foot. The rod or turning-point c, to which the arms and shafts are hung, is above the draft-line from the axle, for the purpose of causing the draft of the rake to help raise it. When the rake is raised the said turning-point is below the said line, therefore the draft helps throw it down; also, the above arrangement—i. e., the turning-point being above the draft-line—throws the teeth back from under the hay while they rise, or, in other words, it is farther from the axle to the point where the shafts are attached to the horse when the rake is raised apart of the way than when it is down. The teeth rising from a point at the axle—i. e., from a point nearer to them—describe a smaller circle than those hung the old way. Therefore they leave the hay quicker and strike the ground nearer to it. A frame, r, is attached to the board f, the top of which supports the hand and a strap, l, which is attached to the middle block, E, near the shoe, for the purpose of steadying the rake.

I do not claim the invention of the independent tooth; but

What I do claim as my invention, and desire to secure by Letters Patent, is—

The arrangement of the boxes k, arch-arms b, elastic spring g, shoe d, strap t, frame r, and strap l, arranged and operating as described, for the purposes set forth.

In witness whereof I have hereunto subscribed my name the 4th day of January, 1859.

GEORGE S. REYNOLDS.

Witnesses:
 NORMAN FOWLER,
 ZOPHAR VINTON.